(12) United States Patent
Lee et al.

(10) Patent No.: US 9,193,804 B2
(45) Date of Patent: Nov. 24, 2015

(54) RESISTANT STARCH WITH IMPROVED PROCESSABILITY AND METHOD OF PREPARING THE SAME

(75) Inventors: Sun Young Lee, Incheon (KR); Ji Hye Choi, Seoul (KR); Tae Yong Kim, Seoul (KR); Young Seung Jeon, Seoul (KR)

(73) Assignee: Daesang Corporation (KR)

( * ) Notice: Subject to any disclaimer, the term of this patent is extended or adjusted under 35 U.S.C. 154(b) by 366 days.

(21) Appl. No.: 13/604,971

(22) Filed: Sep. 6, 2012

(65) Prior Publication Data
US 2013/0158251 A1    Jun. 20, 2013

(30) Foreign Application Priority Data

Dec. 16, 2011    (KR) .................... 10-2011-0136028

(51) Int. Cl.
| | | |
|---|---|---|
| *C08B 31/00* | (2006.01) | |
| *A23L 1/0522* | (2006.01) | |
| *A23L 1/308* | (2006.01) | |

(52) U.S. Cl.
CPC ........... *C08B 31/003* (2013.01); *A23L 1/05223* (2013.01); *A23L 1/308* (2013.01)

(58) Field of Classification Search
CPC .... A23L 1/308; A23L 1/05223; C08B 31/003
USPC ........................................................ 536/106
See application file for complete search history.

(56) References Cited

U.S. PATENT DOCUMENTS

| | | | |
|---|---|---|---|
| 3,751,410 A | * | 8/1973 | Caracci et al. ................. 536/106 |
| 7,276,126 B2 | * | 10/2007 | Nehmer et al. .................. 127/71 |
| 2006/0272634 A1 | | 12/2006 | Nehmer et al. |
| 2007/0275155 A1 | | 11/2007 | Nehmer et al. |

FOREIGN PATENT DOCUMENTS

| | | | | |
|---|---|---|---|---|
| KR | 10-2002-007067 A | | 9/2002 | |
| KR | 10-0648093 B1 | | 11/2006 | |
| KR | 10-2007-0095206 A | | 9/2007 | |
| KR | 10-2008-0023674 A | | 3/2008 | |
| KR | 20080023674 | * | 3/2008 | .............. C08B 30/12 |
| KR | 10-1068986 | * | 9/2011 | .............. C08B 30/12 |
| KR | 10-1068986 B1 | | 9/2011 | |

OTHER PUBLICATIONS

McPherson and Jane, Extrusion of Cross-Linked Hydroxypropylated Corn Starches II. Morphological and Molecular Characterization, Cereal Chemistry Journal, May/Jun. 2000, pp. 326-332, vol. 77, No. 3.

* cited by examiner

*Primary Examiner* — Ganapathy Krishnan
(74) *Attorney, Agent, or Firm* — The Webb Law Firm

(57) ABSTRACT

There is provided a method of preparing resistant starch with improved processability as one aspect of the present invention, the method comprising: (a) preparing starch modified by a cross-linked bond; and (b) feeding the modified starch to an extruder and then extruding the modified starch to produce an extrudate, in which an extrusion temperature is 50° C. to 200° C. at the time of the extrusion, the ratio of a injection volume of water to a supplying amount of the modified starch, each being supplied into the extruder, is 1.2 ml/g to 2.0 ml/g, and water content in the extrudate is 25 wt % to 50 wt %.

8 Claims, 2 Drawing Sheets

RESISTANT STARCH WITH IMPROVED PROCESSABILITY AND METHOD OF PREPARING THE SAME

CROSS-REFERENCE TO RELATED APPLICATIONS

This application claims the priority of Korean Patent Application No. 2011-136028 filed on Dec. 16, 2011, in the Korean Intellectual Property Office, the disclosure of which is incorporated herein by reference.

BACKGROUND OF THE INVENTION

1. Field of the Invention

This application relates to resistant starch with improved processability and a method of preparing the same. More particularly, this application relates to resistant starch having a predetermined content of total dietary fiber and also improved processability such as dough-forming ability at the same time. In addition, this application relates to a method of preparing resistant starch, of which water holding capacity can be increased by regulating factors such as water injection volume, heat, and pressure, at the time of the extrusion of modified starch that is modified by a cross-linked bond.

2. Description of the Related Art

Starch is a human's main source of carbohydrates and is used as our energy source by decomposing it to glucose through an action of digestive enzyme in a small intestine, and then absorbing the glucose into blood.

Generally, starch is classified into three types, i.e., rapidly digestible starch (RDS), slowly digestible starch (SDS), and resistant starch (RS) depending on a type of digestion in a small intestine (Englyst et al., Classification and measurement of nutritionally important starch fractions. *European Journal of Clinical Nutrition* 46:33-50, 1992).

Among them, the resistant starch is largely divided into four groups according to their types—specifically, RS 1-type that is physically impossible to access; RS 2-type that has a B-type crystal form as raw starch particles, and resistance to α-amylase; RS 3-type that is formed via the aging process; and RS 4-type that has enzyme resistance by a chemical modification.

Many studies have been done on the physiological advantages of resistant starch having the four types as mentioned above. The resistant starch has various effects in that it has the physiological activity similar to oligosaccharides and dietary fibers; is not digested and absorbed in a small intestine; slowly increases blood sugar levels after meals; prevents colorectal cancer, hypertension, hyperlipidemia, and the like by allowing microorganisms to produce short chain fatty acids in a large intestine; inhibits accumulation of fat; and the like. The resistant starch that has the effect disclosed above and also functions as a source of dietary fiber may be useful as a food material.

Meanwhile, the RS 4-type resistant starch having enzyme resistance by a chemical modification is prepared by the techniques of various known methods of preparing (Modified starches: Properties and Uses, Ed. Wurzburg, CRC Press, Inc., Florida, 1986). A method of preparing the RS 4-type resistant starch includes a cross-linking reaction, esterification, eterification, conversion, and the like. More specifically, the resistant starch prepared by the cross-linking reaction includes modified starch, and the like, modified by a cross-linking agent, for example, sodium trimetaphosphate (STMP), phosphoryl chloride, adipic acid anhydrous, and the like; the resistant starch prepared by the esterification includes phosphated starch, acetylated starch, octenyl succinate substituted starch, and the like; and the resistant starch prepared by the eterification includes hydroxypropylated starch, and the like. In addition, the resistant starch prepared by the conversion modification includes acid hydrolyzed starch, the starch oxidized by sodium hypochlorite, the starch modified by enzyme, and the like. The above methods may be used individually or in combination.

Especially, since the material of the resistant starch prepared by the cross-linking reaction has the advantages of a relatively high content of total dietary fiber and an improvement in quality at the time of manufacturing foods, new techniques for an application of the above material to foods have been developing. However, there are several problems that the resistant starch prepared by the conventional cross-linking reaction is lacking in absorption ability of water at the time of the food processing, such as a mixing of the starch itself and water to make dough, a mixing with the flour to make dough, and the like thereby interrupting the dough formation, and the resistant starch is present in a type similar to raw starch particles without a modification of starch particles thereby giving a feeling of irritation to a final product.

SUMMARY OF THE INVENTION

An aspect of the present invention provides a method of preparing RS 4-type resistant starch with at least predetermined content of total dietary fiber and enhanced water holding capacity at the same time in order to solve the conventional problems.

Another aspect of the present invention also provides RS 4-type resistant starch with improved processability, such as dough-forming ability or compatibility with other food materials, such as flour.

The inventors of the present invention have found that resistant starch can be prepared by modifying starch through a cross-linking reaction, and then extruding the modified starch through regulating extrusion conditions, such as water injection volume, heat and pressure when preparing the resistant starch, in which the resistant starch can have at least predetermined content of total dietary fiber and significantly improved physical properties, such as water holding capacity, a degree of gelatinization, and the like, which is significantly associated with processability, such as dough-forming ability at the same time, and thus completed the present invention.

According to an aspect of the present invention, there is provided a method of preparing resistant starch with improved processability, in which the method includes (a) preparing a starch modified by a cross-linked bond; and (b) feeding the modified starch to an extruder and then extruding the modified starch to produce an extrudate, and an extrusion temperature is 50° C. to 200° C. at the time of the extrusion, the ratio of a injection volume of water to a feeding amount of the modified starch, each being put into the extruder, is 1.2 ml/g to 2.0 ml/g, and water content in the extrudate is 25 wt % to 50 wt %.

According to another aspect of the present invention, there is provided resistant starch with improved processability, prepared by the method as mentioned above. At this time, the resistant starch preferably has at least 15% or more of total dietary fiber and 150% or more of water holding capacity.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
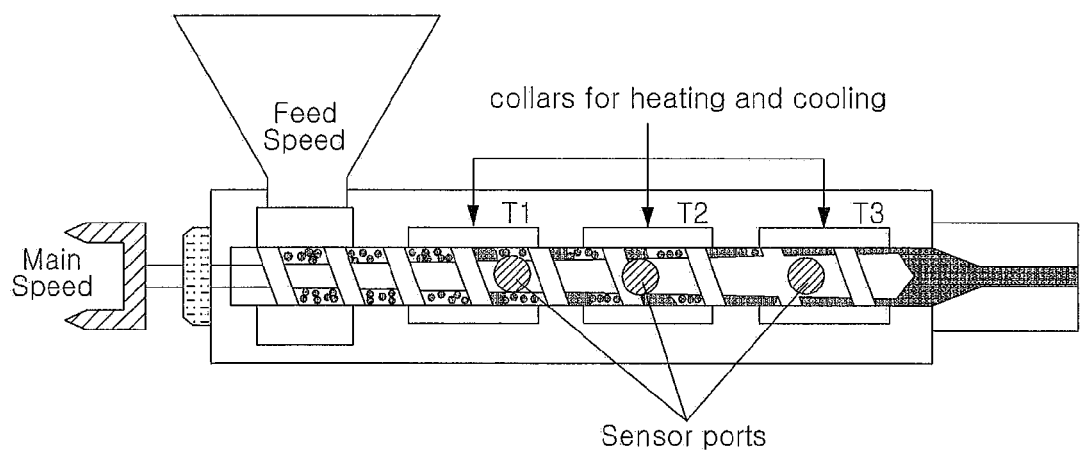
FIG. 1 is a schematic drawing of an extruder used for extruding starch modified by a cross-linked bond in the present invention.

Hereinafter, exemplary embodiments of the present invention will now be described in more detail. An aspect of the present invention provides a method of preparing resistant starch with improved processability. The method of preparing resistant starch includes preparing starch modified by a cross-linked bond, and producing an extrudate by extruding the modified starch.

Preparation of Starch Modified by Cross-Linked Bond

Modified starch by a cross-linked bond means starch obtained by adding a cross-linking agent to a raw starch suspension and then cross-linking. Specifically, the preparing of the starch modified by the cross-linked bond includes preparing a starch suspension with 15 wt % to 60 wt % of a starch concentration; adding the cross-linking agent to the starch suspension and then cross-linking under an alkaline pH condition; and neutralizing, filtering, washing, and then drying the starch suspension subjected to be reacted through the cross-linking reaction.

(1) Preparation of Starch Suspension

A starch suspension is prepared by suspending raw starch in water. At this time, the starch concentration of the starch suspension is 15 wt % to 60 wt %, preferably 25 wt % to 55 wt %, and more preferably 30 wt % to 50 wt %. When the starch concentration of the starch suspension is less than 15 wt %, there are fears efficiency of the following cross-linking reaction could be decreased such that the content of total dietary fiber becomes to be less than 20% in the resulting modified starch. On the other hand, when the starch concentration of the starch suspension exceeds 60 wt %, it is difficult to uniformly stir the starch suspension such that it is not easy to prepare modified starch with a uniform quality. When the starch concentration of the starch suspension is 30 wt % to 50 wt %, the modified starch can be economically produced and also can have high content of total dietary fiber (for example, at least 40%).

The type of raw starch used for a starch suspension is not greatly limited to, that is, unmodified starch or modified starch, and the like. For example, the raw starch may be any one selected from the group consisting of corn starch, waxy corn starch, rice starch, tapioca starch, potato starch, sweet potato starch, or wheat starch, and may be the mixed starch that is prepared by mixing at least two of them. In addition, unmodified starch, and the like, such as sago starch, sorghum starch, or high amylose starch (for example, starch with amylose content of at least 40 wt %) may be used as the raw starch. In addition, the modified starch used as the raw starch in the starch suspension may include phosphated starch that is modified by phosphate, such as sodium tripolyphosphate (STPP), acetylated starch, octenylsuccinate substituted starch, hydroxypropylated starch, acid hydrolyzed starch, oxidized starch, or enzyme hydrolyzed starch.

(2) Cross-Linking Reaction of Starch Suspension

A cross-linking reaction of a starch suspension includes adding a cross-linking agent to the starch suspension and then cross-linking the resulting starch suspension under a high alkaline pH condition. At this time, the type of the cross-linking agent may be not greatly limited as long as the cross-linking agent can give enzyme-resistant property by chemically modifying starch through a Cross-linked Bond. For example, phosphoryl chloride, sodium trimetaphosphate (STMP), sodium tripolyphosphate (STPP), adipic acid, adipic acid anhydride, epichlorohydrin, and the like may be used, and phosphorylating agent may be preferably used, especially considering efficiency of the cross-linking reaction and ability for giving the enzyme-resistant property.

The phosphorylating agent may be any one selected from the group consisting of phosphoryl chloride, sodium trimetaphosphate (STMP), sodium tripolyphosphate (STPP), and mixture thereof, and the mixture may be one mixed with at least two of them. In addition, the phosphorylating agent may be preferably the mixture of phosphoryl chloride and sodium tripolyphosphate (STPP); more preferably, the mixture of sodium trimetaphosphate (STMP) and sodium tripolyphosphate (STPP); and most preferably, the mixture of sodium trimetaphosphate (STMP) and sodium tripolyphosphate (STPP). When the mixture of sodium trimetaphosphate (STMP) and sodium tripolyphosphate (STPP) is used as the cross-linking agent, the weight ratio of the sodium trimetaphosphate (STMP) and sodium tripolyphosphate (STPP) is 90:10 to 99.9:0.1.

The adding amount of a cross-linking agent is, but is not greatly limited to, for example, preferably 1 part to 30 parts by weight, relative to 100 parts by weight of dried starch of a starch suspension; more preferably 2 parts to 25 parts by weight, relative to 100 parts by weight of dried starch of a starch suspension; and most preferably 5 parts to 15 parts by weight of dried starch of a starch suspension, considering in terms of economic feasibility and food standard, in order to achieve the proper level of total dietary fiber content.

In addition, the temperature of a cross-linking reaction of a starch suspension is, but is not greatly limited to, preferably 30° C. to 60° C., and more preferably 40° C. to 60° C. to ensure reliability for reaction efficiency and a preparation of resistant starch.

In addition, a reaction time of a cross-linking reaction of a starch suspension is, but is not greatly limited to, at least 0.5 hours or more, for example, 0.5 hours to 12 hours, considering in terms of giving resistant property by the cross-linking reaction, and also preferably 1 hour to 10 hours and more preferably 1 hour to 5 hours, considering in terms of giving reliable security for resistant property and economic feasibility in a preparing process.

In addition, pH of a cross-linking reaction of a starch suspension may be not greatly limited as long as pH satisfies an alkaline condition, and may be preferably 10 to 14, considering reaction efficiency, and more preferably 11 to 13, in terms of obtaining stability of process by protecting a partial gelatinization of the starch suspension.

(3) After-Treatment of Starch Suspension Subjected to Cross-Linking Reaction

Modified starch with enzyme-resistant property is prepared by a cross-linking reaction and then the starch suspension subjected to the cross-linking reaction may be subjected to neutralization, filtration, washing, and drying as an after-treating. Specifically, the starch suspension subjected to the cross-linking reaction is neutralized to be approximately pH 5 to 7 by using an acid, and the like, and then the neutralizing starch suspension is filtered by a filter bag, and the like. Accordingly, approximately 5 to 20-fold of dried starch is washed with water during a filtering process. After washing, the resulting modified starch in a cake type is dried and then ground to prepare the starch in a powder type.

Production of Extrudate by Extruding Modified Starch

Starch modified by a Cross-linked Bond is extruded in a type of extrudate by an extruder. At this time, physical properties, such as water holding capacity, a degree of gelatinization, and the like, can be improved. The extruder used for extruding the starch modified by the Cross-linked Bond may be not greatly limited as long as it is known or is a general one comprising a driving part, a feeder, a screw, a barrel, and a die as shown in FIG. 1, and for example, preferably, a single screw extruder, a twin screw extruder, and the like.

A twin screw extruder has advantages that water content in a raw material to be treated has a wide range; the reaction can be closely controlled according to a distribution of barrel temperature, a screw configuration, or a change of die shape; and less power is consumed, as compared with a single screw extruder. In addition, the barrel of the extruder has a pressure-resistant constitution to withstand hundreds of atmospheric pressure and can control the temperature at each of parts because it is divided in different parts. The modified starch supplied into the extruder in the extruding process receives thermal energy from the barrel, and final extruding temperature is the same with the temperature condition of the latter part of the barrel (see T3 in FIG. 1) that is close to the die when the extruder includes plurality of barrels.

A method of preparing resistant starch according to one aspect of the present invention maintains conditions of extruding, for example, the ratio of an adding amount of modified starch and a supplying rate of extrusion water, and water content of an extrudate in a specific range when extruding the modified starch in order to improve processability of the modified starch. Especially, the temperature of extruding at the time of the extrusion may be 50° C. to 200° C., and preferably 60° C. to 160° C.; more preferably, 60° C. to 80° C. in terms of a rate of maintaining the content of total dietary fiber of the resistant starch; and most preferably, 80° C. to 160° C. in terms of an increase of water holding capacity of the resistant starch. However, the temperature of extruding in a proper range may be depended on the content of cross-linking agent in the modified starch. Referring to the temperature of extruding, the extruder may preferably include plurality of barrels, i.e., at least two barrels and the temperature of the plurality of barrels may be each independently selected from 50° C. to 200° C. at the time of the extrusion.

In addition, the ratio of a injection volume of water to a feeding amount of the modified starch, each being put into the extruder, is 1.2 ml/g to 2.0 ml/g, and preferably 1.4 ml/g to 1.8 ml/g. At this time, water content of the modified starch feeding to the extruder may be preferably less than 15% (w/w) and more preferably less than 12% (w/w).

In addition, water content of an extrudate may be 25 wt % to 50 wt % and preferably 30 wt % to 45 wt %. The water content of the extrudate may be complexly depended on the temperature of extruding, a rate of the supplying amount of the modified starch and rate of water injection, an extrusion velocity (or rotative velocity of a screw), and the like. When the water content of the extrudate is less than 25 wt %, there are fears it can overload the extruder such that the extrusion cannot be performed, smoothly. On the other hand, when the water content of the extrudate exceeds 50 wt %, there are fears the extrudate cannot have a regular shape and thus flow down such that the following pelletization, drying and grinding cannot be smoothly performed.

In addition, The extrusion pressure may be complexly depended on the temperature of extruding, a rate of the supplying amount of the modified starch and supplying rate of extrusion water, an extrusion velocity (or rotative velocity of a screw), and the like, at the time of the extrusion. At this time, the extrusion pressure may be not greatly limited as long as it is in the range that is susceptible by the extruder, and for example, relative to the gauge pressure of the extruder, may be 0 MPa to 8 MPa; preferably may be less than 4 MPa in terms of the rate of maintaining the content of total dietary fiber; and preferably may exceed 2 MPa in terms of an increase of water content in the resistant starch. However, the extrusion pressure in a proper range may be depended on the content of cross-linking agent in the modified starch. The gauge pressure may be not measured based on the pressure in a vacuum, but may be measured based on the atmospheric pressure.

The extrudate extruded in the extruder, i.e., the resistant starch may be pelletized at the time of the extrusion, and then dried and ground to obtain the resistant starch in a powder type.

Another aspect of the present invention provides resistant starch with improved processability, prepared by the method as mentioned above. The resistant starch prepared by the method of preparing according to the present invention is the RS 4-type resistant starch, and has preferably at least 15% or more (for example 15% to 80%), more preferably at least 20%, and most preferably at least 25% of the content of total dietary fiber.

In addition, the resistant starch prepared by the method of preparing according to the present invention allows starch particles to be easily swelled at room temperature thereby significantly increasing water content and the degree of gelatinization prior to extruding as compared with modified starch. For example, when the water content of the modified starch prior to extruding is 80% to 95% and the degree of gelatinization is 60% to 65%, the resistant starch of the present invention obtained by extruding under a special condition has the range of water holding capacity of 110% to 220%, preferably 150% to 220%, and more preferably 150% to 210%, and has the range of the degree of gelatinization of 80% to 120%, preferably 90% to 120%, and more preferably 100% to 120%.

According to the increased water holding capacity and degree of gelatinization as mentioned above, the resistant starch in terms of another aspect of the present invention has a significantly increased dough-forming ability itself or dough-forming ability by mixing with other food material, such as flour, and also improved food processability. Accordingly, the resistant starch according to another aspect of the present invention may be used as a source of dietary fiber, and the like, in food to be processed, such as dough. For example, the resistant starch prepared by the method of the present invention may be used for food in various types, such as crackers, breads, and noodles, and also may be useful as a raw material of dietary fiber source in health functional foods or medicines for preventing or treating diabetes, hyperlipidemia, obesity, and the like.

Hereinafter, the present invention will be described in more detail with reference to the following Examples. However, the following Examples are only for clearly illustrating the present invention, but the protected range of the present invention will not be limited to the following Examples.

1. Preparation of Starch Modified by Cross-Linked Bond

Preparation Example 1

A starch suspension with 40 wt % of corn starch (Manufacturing company: DAESANG Corporation, Korea) concentration was added to a reactor of which a temperature could be controlled, sodium sulfate was added to be 10 parts by weight, relative to 100 parts by weight of dried starch of the starch suspension, and then a cross-linking agent was added to be 12 parts by weight, relative to 100 parts by weight of dried starch of the starch suspension. Since then, the mixture in the reactor was stirred. At this time, the mixture of sodium trimetaphosphate (STMP) and sodium tripolyphosphate (STPP) was used as a cross-linking agent and the weight ratio of the sodium trimetaphosphate (STMP) and the sodium tripolyphosphate (STPP) in the mixture was 99:1. Since then, a temperature in the reactor was increased to approximately 50° C., and then pH of the starch suspension was adjusted to be approximately 11.3 by using an aqueous solution of 4% sodium hydroxide. Since then, while the temperature of the reaction was maintained at approximately 50° C., the cross-linking reaction was carried out. After completing the cross-linking reaction, pH of the starch suspension was neutralized to be approximately 5.0 to 6.0 by using an aqueous solution of 15% hydrochloric acid, and then filtered through filter for performing first dehydration. And then, the starch suspension was washed with approximately 10-fold water to the weight of dried starch and second hydrated to obtain modified starch in a cake type modified by a cross-linked bond. The resulting modified starch in a cake type was put into a dryer and dried at approximately 50° C. to have approximately less than 12 wt % of water content. Since then, the dried modified starch was ground.

Preparation Example 2

Modified starch was obtained by using the method similar to Preparation Example 1, except that a cross-linking agent was added in 8 parts by weight, relative to 100 parts by weight of dried starch in a starch suspension.

Preparation Example 3

Modified starch was obtained by using the method similar to Preparation Example 1, except that a cross-linking agent was added in 3 parts by weight, relative to 100 parts by weight of dried starch in a starch suspension.

2. Preparation of Resistant Starch Through Extrusion of Starch Modified by Cross-Linked Bond

Preparation Example 4

As shown in FIG. 1, a twin screw extruder consisting of a driving part, a feeder, a screw, a barrel, and a die was prepared. At this time, the extruder was equipped with three-part barrels (T1, T2 and T3 as shown in FIG. 1), and the barrel that is close to a raw material feeder had a function to inject water. In addition, a temperature sensor was attached to each barrel in the extruder, and a pressure gauge (Not shown in FIG. 1) was attached between a terminal barrel (T3 as shown in FIG. 1) and the die.

The modified starch in a powder type prepared in Preparation Example 1 was injected to the raw material feeder in a velocity of approximately 200 g/min and then extruded while maintaining a rotative velocity of the screw in approximately 500 rpm to obtain an extrudate with approximately 39 wt % of water content. At this time, the temperatures of T1, T2 and T3 that were three-part barrels in the extruder were maintained in approximately 60° C., approximately 160° C., and approximately 160° C. in order (the temperature of barrel, T3 was corresponded to an extrusion temperature). In addition, injection water at room temperature was injected to barrel, T1 in a velocity of approximately 340±2 ml/min and gauge pressure was 0 MPa at the time of the extrusion.

The resulting extrudate was pelletized, dried in a dryer to have less than 12 wt % of water content, and then ground.

Preparation Examples 5 to 19

Resistant starch was obtained by using the method similar to Preparation Example 4, except that the temperatures of three-part barrels in an extruder and a velocity of injection of water were different from those of Preparation Example 4 as shown in the following Table 1. At this time, gauge pressure at the time of the extrusion and water content of the extrudate were determined by the temperatures of three-part barrels and the velocity of injection of water.

Preparation Example 20

Resistant starch was obtained by using the method similar to Preparation Example 4, except that the modified starch prepared in Preparation Example 2 was injected to a raw material feeder in an extruder, and the temperatures of three-part barrels and the velocity of water injection were different from those of Preparation Example 4.

Preparation Example 21

Resistant starch was obtained by using the method similar to Preparation Example 4, except that the modified starch prepared in Preparation Example 3 was injected to a raw material feeder in an extruder, and the temperatures of three-part barrels were different from those of Preparation Example 4.

Comparative Preparation Example 1

The modified starch prepared in Preparation Example 1 was injected into a raw material feeder in an extruder and then was tried to be extruded by using the method similar to Preparation Example 4, except that water was injected into a barrel, T1 in a velocity of approximately 50±2 ml/min. Such a condition was generally to gelatinize general corn starch through the extruder. When the modified starch prepared in Preparation Example 1 was generally extruded under the condition of gelatinizing general corn starch, the starch was not extruded due to an overload of the extruder thereby not obtaining an extrudate.

Comparative Preparation Example 2

Instead of the modified starch prepared in Preparation Example 1, general corn starch (Manufacturing company: DAESANG Corporation, Korea) was injected into a raw material feeder in an extruder and then extruded by using the method similar to Preparation Example 4. At this time, the extrudate could not have a certain shape because of very low viscosity and thus flow down such that the following pelletization, drying, and grinding could not be performed.

The extrusion conditions and water contents of extrudates in Preparation Examples 4 to 21 and Comparative Preparation Examples 1 and 2 are shown in the following Table 1.

TABLE 1

| Items | Extrusion Condition | | | | | Water Content of Extrudate |
|---|---|---|---|---|---|---|
| | Barrel, T1 Temp. (° C.) | Barrel, T2 Temp. (° C.) | Barrel, T3 Temp. (° C.) | Velocity of Supplying Extrusion Water (ml/min) | Gauge Pressure Upon Extruding (MPa) | |
| P. Ex. 4 | 60 | 160 | 160 | 340 ± 2 | 0 | 39 ± 1 |
| P. Ex. 5 | 60 | 160 | 160 | 332 ± 2 | 1 | 37 ± 1 |
| P. Ex. 6 | 60 | 160 | 160 | 323 ± 2 | 2 | 36 ± 1 |
| P. Ex. 7 | 60 | 80 | 80 | 340 ± 2 | 0 | 40 ± 1 |
| P. Ex. 8 | 60 | 80 | 80 | 332 ± 2 | 1 | 40 ± 1 |
| P. Ex. 9 | 60 | 80 | 80 | 323 ± 2 | 2 | 37 ± 1 |
| P. Ex. 10 | 60 | 80 | 80 | 314 ± 2 | 3 | 36 ± 1 |
| P. Ex. 11 | 60 | 80 | 80 | 305 ± 2 | 4 | 34 ± 1 |
| P. Ex. 12 | 60 | 80 | 80 | 298 ± 2 | 5 | 33 ± 1 |
| P. Ex. 13 | 60 | 60 | 60 | 340 ± 2 | 0 | 42 ± 1 |
| P. Ex. 14 | 60 | 60 | 60 | 332 ± 2 | 1 | 40 ± 1 |
| P. Ex. 15 | 60 | 60 | 60 | 323 ± 2 | 2 | 38 ± 1 |
| P. Ex. 16 | 60 | 60 | 60 | 314 ± 2 | 3 | 38 ± 1 |
| P. Ex. 17 | 60 | 60 | 60 | 305 ± 2 | 4 | 35 ± 1 |
| P. Ex. 18 | 60 | 60 | 60 | 298 ± 2 | 5 | 33 ± 1 |
| P. Ex. 19 | 60 | 60 | 60 | 294 ± 2 | 6 | 32 ± 1 |
| P. Ex. 20 | 60 | 60 | 60 | 332 ± 2 | 3 | 39 ± 1 |
| P. Ex. 21 | 60 | 60 | 60 | 340 ± 2 | 3 | 39 ± 1 |
| Com. P. Ex. 1 | 60 | 160 | 160 | 50 ± 2 | — | — |
| Com. P. Ex. 2 | 60 | 160 | 160 | 340 ± 2 | — | — |

3. Change of Physical Property Before/after Extrusion of Starch Modified by Cross-Linked Bond In order to confirm a change of physical property before/after an extrusion of starch modified by a cross-linked bond, the content of total dietary fiber, water holding capacity, and a degree of gelatinization for the modified starch (Preparation Examples 1 to 3) modified by a cross-linked bond and the resistant starch (Preparation Examples 4 to 21) obtained by extruding the above modified starch were measured. In addition, the retention rates of total dietary fiber content of the resistant starch obtained in Preparation Examples 4 to 21 were calculated based on the results of total dietary fiber contents of the modified starches obtained from Preparation Examples 1 to 3 and resistant starch obtained in Preparation Examples 4 to 21.

(1) Measurement of Total Dietary Fiber (TDF) Content and Calculation of Retention Rate of Total Dietary Fiber Content The content of total dietary fiber was measured based on AOAC 991.43. 1.0 g of starch sample was dispersed by adding 40 ml of MES-Tris buffer solution with 0.05 M concentration (pH 8.2), and then 50 μl of thermal-stable α-amylase was added to the dispersed starch sample and then reacted in boiling water of 100° C. for 30 minutes. The reaction solution was quickly cooled and stabilized by putting in a constant-temperature water bath for 30 minutes. An aqueous solution of 0.567 N concentration of hydrochloric acid was added to the reaction solution to adjust to be the range of pH 4.3 to 4.7. Since then, 300 μl of amyloglucosidase solution was added and then reacted at 60° C. for 30 minutes. After completing the reaction, the resulting digested material was cooled to room temperature, and then glucose content that was digested was measured according to GOD-POD method. Specifically, 1 ml of GOD-POD solution was added to a micro tube, 100 μl of the supernatant of the digested material was added and then cultured in a constant-temperature water bath of 37° C. for 20 minutes. An absorbance was measured at 505 nm using UV Spectrophotometer and then converted to the content of digested glucose.

In addition, the retention rate of total dietary fiber content of the resistant starch obtained by extruding starch modified by a cross-linked bond was calculated by using the following Formula.

$$\text{Retention Rate of Total Dietary Fiber Content (\%)} = \frac{\text{Total Dietary Fiber Content of Starch Obtained After Extrusion}}{\text{Total Dietary Fiber Content of Starch Before Extrusion}} \times 100$$

(2) Measurement of Water Holding Capacity 3 g of starch sample based on anhydrides was added to a tube, 1 ml of methanol was added to the tube, and then 29 ml of distilled water of 25° C. was added while stirring with a glass rod. The tube was left at room temperature while shaking for 18 hours, and then centrifuged at 4000 rpm for 30 minutes by using a centrifuge. Since then, the supernatant was poured out and then weight of the precipitate was measured. Water holding capacity was calculated according to the following formula.

Water holding capacity(%)=[(Weight of Precipitate−Weight of Anhydrous Starch Sample)×100]/[Weight of Anhydrous Starch Sample]

(3) Measurement of Degree of Gelatinization

Based on anhydride, 1.0 g of starch sample was added, 1 ml of methanol was added, and then distilled water of 25° C. was added while stirring with a glass rod to fill up to 50 ml-marked line of the tube. Since then, the tube was put in a constant-temperature water bath of 25° C., left for 30 minutes, and then centrifuged at 4000 rpm for 30 minutes by using a centrifuge. Since then, the supernatant was poured out and then weight of the precipitate was measured. The supernatant was transferred to an evaporator, evaporated, dried at 110° C. for 3 hours, and then dried weight of the remaining supernatant was measured. A degree of swelling at 25° C. was calculated using the following formula.

Solubility(%)=[Dried Weight of Supernatant (mg)× 100]/[Dried Weight of Starch Sample (mg)]

Degree of Swelling=[Weight of Precipitate (mg)× 100]/[Dried Weight of Starch Sample (mg)× (100−Solubility)]

In addition, 1.0 g of the same starch sample was added to a tube, 1 ml of methanol was added, and then distilled water of 25° C. was added while stirring with a glass rod to fill up to 50 ml-marked line of the tube. Since then, the tube was put in a constant-temperature water bath of 95° C., heated for 30 minutes, and then centrifuged at 4000 rpm for 30 minutes by using a centrifuge. And then, the supernatant was poured out and then weight of the precipitate was measured. The supernatant was transferred to an evaporator, evaporated, dried at 110° C. for 3 hours, and then dried weight of the remaining supernatant was measured. A degree of swelling at 95° C. was calculated using the same formula as the formula calculating the degree of swelling at 25° C. Since then, a degree of gelatinization was calculated by using the following formula.

Degree of Gelatinization(%)=[Degree of Swelling at 25° C.×100]/[Degree of Swelling at 95° C.]

(4) Result of Measuring Physical Property Before/After Extrusion of Starch Modified by Cross-Linked Bond The results of measuring physical property of starch modified by a cross-linked bond are shown in the following Table 2 and Table 3. The following Table 2 shows a change of total dietary fiber content before/after extruding the modified starch and a retention rate of total dietary fiber content and the following Table 3 shows changes of Water holding capacity and degree of gelatinization before/after extruding the modified starch.

TABLE 2

| Items | Total Dietary Fiber Content (%) Before Extrusion | Total Dietary Fiber Content (%) After Extrusion | Retention Rate of Total Dietary Fiber Content (%) |
|---|---|---|---|
| P. Ex. 4 | 83 | 25 | 30 |
| P. Ex. 5 | 83 | 20 | 24 |
| P. Ex. 6 | 83 | 19 | 23 |
| P. Ex. 7 | 83 | 35 | 42 |
| P. Ex. 8 | 83 | 28 | 34 |
| P. Ex. 9 | 83 | 30 | 36 |
| P. Ex. 10 | 83 | 29 | 35 |
| P. Ex. 11 | 83 | 25 | 35 |
| P. Ex. 12 | 83 | 78 | 30 |
| P. Ex. 13 | 83 | 78 | 94 |
| P. Ex. 14 | 83 | 78 | 94 |
| P. Ex. 15 | 83 | 75 | 90 |
| P. Ex. 16 | 83 | 66 | 80 |
| P. Ex. 17 | 83 | 60 | 72 |
| P. Ex. 18 | 83 | 24 | 29 |
| P. Ex. 19 | 83 | 26 | 31 |
| P. Ex. 20 | 51 | 24 | 47 |
| P. Ex. 21 | 30 | 13 | 43 |

TABLE 2

| Items | Water holding capacity (%) Before Extrusion | Water holding capacity (%) After Extrusion | Degree of Gelatinization (%) Before Extrusion | Degree of Gelatinization (%) After Extrusion |
|---|---|---|---|---|
| P. Ex. 4 | 93 | 189 | 65 | 113 |
| P. Ex. 5 | 93 | 193 | 65 | 116 |
| P. Ex. 6 | 93 | 198 | 65 | 118 |
| P. Ex. 7 | 93 | 181 | 65 | 107 |
| P. Ex. 8 | 93 | 190 | 65 | 107 |
| P. Ex. 9 | 93 | 197 | 65 | 108 |
| P. Ex. 10 | 93 | 201 | 65 | 110 |
| P. Ex. 11 | 93 | 206 | 65 | 114 |
| P. Ex. 12 | 93 | 208 | 65 | 115 |
| P. Ex. 13 | 93 | 110 | 65 | 79 |
| P. Ex. 14 | 93 | 112 | 65 | 83 |
| P. Ex. 15 | 93 | 158 | 65 | 92 |
| P. Ex. 16 | 93 | 177 | 65 | 104 |
| P. Ex. 17 | 93 | 209 | 65 | 107 |
| P. Ex. 18 | 93 | 211 | 65 | 108 |
| P. Ex. 19 | 93 | 209 | 65 | 113 |
| P. Ex. 20 | 82 | 196 | 52 | 110 |
| P. Ex. 21 | 79 | 199 | 51 | 107 |

As shown in Table 2 and Table 3, an extrusion temperature was preferably less than 80° C., considering in terms of a retention rate of total dietary fiber content and extrusion pressure was preferably less than 4 MPa based on pressure gauge of an extruder. In addition, the extrusion temperature preferably exceeds 60° C., considering in terms of Water holding capacity and a degree of gelatinization, and when the extrusion temperature was 60° C., the extrusion pressure preferably exceeds 2 MPa.

4. Change of Processability Before/After Extrusion of Starch Modified by Cross-Linked Bond In order to confirm a change of processability before/after extruding starch modified by a cross-linked bond, the properties of dough of the modified starch (Preparation Example 1) modified by the cross-linked bond and resistant starch (Preparation Example 16) obtained by extruding the modified starch were estimated. Specifically, starch sample and water were mixed in a weight rate of 50:50, and then a dough-forming ability was estimated.

Figure 2:
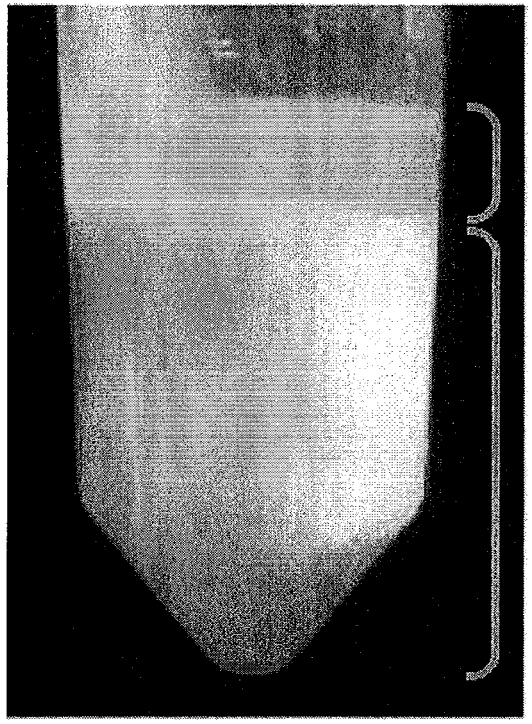
FIG. 2 is a photograph illustrating the state of a modified starch (prepared in Preparation Example 1) when leaving the starch modified by a cross-linked bond after mixing with water.
Figure 3:
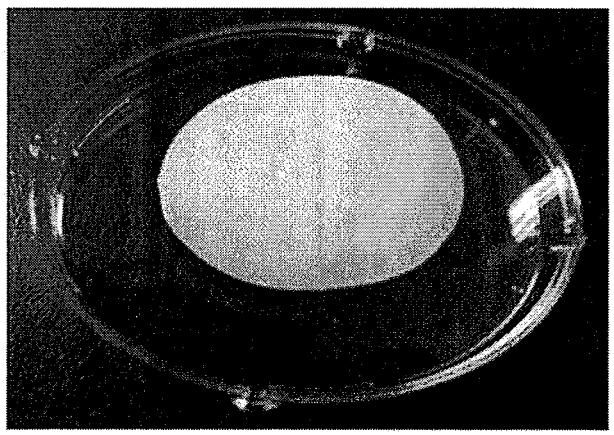
FIG. 3 is a photograph illustrating the state of resistant starch when making dough by mixing the resistant starch (prepared in Preparation Example 16) according to the present invention prepared by extruding the starch modified by a cross-linked bond, with water.

FIG. 2 is a photograph illustrating the state of a modified starch (prepared in Preparation Example 1) when leaving the starch modified by a cross-linked bond after mixing with water, and FIG. 3 is a photograph illustrating the state of resistant starch when making dough by mixing the resistant starch (prepared in Preparation Example 16) according to the present invention prepared by extruding the starch modified by a cross-linked bond, with water.

As shown in FIGS. 2 and 3, since the starch itself modified by the cross-linked bond has low water holding capacity, the starch sample and water are separated. On the other hand, the resistant starch obtained by extruding has an increased water holding capacity thereby forming viscous dough uniformly.

As set forth above, according to exemplary embodiments of the invention, RS 4-type resistant starch prepared by the preparing method according to the present invention has a predetermined content of total dietary fiber and a significantly increased physical property, such as water holding capacity, a degree of gelatinization, and the like. Accordingly, when the RS-4 type resistant starch prepared by the preparing method according to the present invention is used as a raw material of foods to be processed through making a dough with various components, such as a baking, snacks, cereal, and noodles, the resistant starch can provide a homogenous dough without a separate heat treatment and remove a feeling of irritation from a final product.

While the present invention has been shown and described in connection with the exemplary embodiments, it will be apparent to those skilled in the art that modifications and variations can be made without departing from the spirit and scope of the invention as defined by the appended claims.

What is claimed is:

1. A method of preparing resistant starch with improved processability, the method comprising:
  (a) preparing starch modified by a cross-linked bond; and
  (b) feeding the modified starch to an extruder and then extruding the modified starch to produce an extrudate,
  in which an extrusion temperature is 60° C. to 80° C. at the time of the extrusion, the ratio of an injection volume of water to a supplying amount of the modified starch, each being supplied into the extruder, is 1.5 ml/g to 2.0 ml/g, water content in the extrudate is 33 wt % to 40 wt % at the time of the extrusion, and the extrusion pressure is 2 MPa to 4 MPa, based on gauge pressure in the extruder.

2. The method of claim 1, wherein the step of (a) includes:
  (a1) preparing a starch suspension with 15 wt % to 60 wt % of a starch concentration;
  (a2) adding a cross-linking agent to the starch suspension and then cross-linking under an alkaline pH condition; and
  (a3) neutralizing, filtering, washing, and drying the starch suspension subjected to the cross-linking reaction.

3. The method of claim 2, wherein the amount of the cross-linking agent added in the step of (a2) is 2 parts to 25 parts by weight, relative to 100 parts by weight of dried starch in the starch suspension.

4. The method of claim 2, wherein the cross-linking agent used in the step of (a2) is one selected from the group consisting of phosphoryl chloride, sodium trimetaphosphate (STMP), sodium tripolyphosphate (STPP), and mixture thereof.

5. The method of claim 4, wherein the cross-linking agent used in the step of (a2) is the mixture of sodium trimetaphosphate (STMP) and sodium tripolyphosphate (STPP) and the weight rate of the sodium trimetaphosphate (STMP) to the sodium tripolyphosphate (STPP) in the mixture is 90:10 to 99.9:0.1.

6. The method of claim 2, wherein the alkaline pH condition used in the step of (a2) is 10 to 14.

7. The method of claim 2, wherein the starch used in the step of (a1) is one selected from the group consisting of corn starch, waxy corn starch, rice starch, tapioca starch, potato starch, sweet potato starch, wheat starch, and the mixed starch thereof.

8. The method of claim 1, wherein the extruder used in the step of (b) includes a plurality of barrels, i.e., at least 2 or more and the temperatures of the plurality of barrels are each independently selected from the range of 60° C. to 80° C. at the time of the extrusion.

* * * * *